(12) United States Patent
Fraim et al.

(10) Patent No.: US 9,409,800 B2
(45) Date of Patent: Aug. 9, 2016

(54) ELECTRIC ARC FOR AQUEOUS FLUID TREATMENT

(71) Applicant: GLOBAL WATER HOLDINGS, LLC, Wilmington, DE (US)

(72) Inventors: Michael Fraim, College Station, TX (US); Sanjeev Jakhete, Stuart, FL (US)

(73) Assignee: GLOBAL WATER HOLDINGS, LLC, Wilmington, DE (US)

( * ) Notice: Subject to any disclaimer, the term of this patent is extended or adjusted under 35 U.S.C. 154(b) by 0 days.

(21) Appl. No.: 14/707,682

(22) Filed: May 8, 2015

(65) Prior Publication Data

US 2015/0307371 A1    Oct. 29, 2015

Related U.S. Application Data

(63) Continuation of application No. 13/252,198, filed on Oct. 4, 2011, now Pat. No. 9,028,689.

(51) Int. Cl.

| | |
|---|---|
| *C02F 1/46* | (2006.01) |
| *C02F 1/467* | (2006.01) |
| *C02F 1/30* | (2006.01) |
| C02F 1/78 | (2006.01) |
| C02F 101/36 | (2006.01) |
| C02F 101/30 | (2006.01) |
| C02F 101/32 | (2006.01) |

(52) U.S. Cl.
CPC .............. *C02F 1/4672* (2013.01); *C02F 1/30* (2013.01); *C02F 1/46* (2013.01); *C02F 1/4608* (2013.01); *C02F 1/78* (2013.01); *C02F 2101/30* (2013.01); *C02F 2101/306* (2013.01); *C02F 2101/327* (2013.01); *C02F 2101/36* (2013.01); *C02F 2101/363* (2013.01); *C02F 2201/4619* (2013.01); *C02F 2305/023* (2013.01)

(58) Field of Classification Search
CPC ............... C07C 1/00; C02F 1/46; C02F 1/78; C02F 101/10; C02F 101/30; C02F 2101/327; C02F 2101/306; C02F 2101/30
USPC .......... 210/153, 243, 748.01, 748.17; 422/22, 422/186, 186.04; 204/156, 157.15, 164, 204/518, 554
See application file for complete search history.

(56) References Cited

U.S. PATENT DOCUMENTS 7,931,813 B2 *   4/2011   Asokan ..................... A61L 2/02
                                                      205/722

* cited by examiner

*Primary Examiner* — Walter D Griffin
*Assistant Examiner* — Cameron J Allen
(74) *Attorney, Agent, or Firm* — Daniel S. Polley, P.A.

(57) ABSTRACT

An aqueous fluid treatment method and system is provided which preferably uses a 3 step electro-chemical oxidation process to remove organic contaminates from water. A high surface area electro-chemical reaction cell can be employed to remove organic particles and precipitate hardness salts from the aqueous solution. Several 3-phase spark arcs generated mixed oxidants and acoustic cavitations to remove dissolved organic compounds and oxidize organic metal compounds in the next step. Finally, a dielectric discharge in aqueous foam is used to eliminate recalcitrant organic compounds such as, but not limited to, polychlorinated aromatics, disinfectants, pesticides, and pharmaceuticals before release to environment or recycled.

1 Claim, 9 Drawing Sheets

THREE ELECTRODE SPARK PLUG

CROSS SECTION VIEW OF
THREE ELECTRODE SPARK PLUG

REACTOR PIPE WITH SPARK PLUGS AND CAPACITATIVE DISCHARGE TUBE.

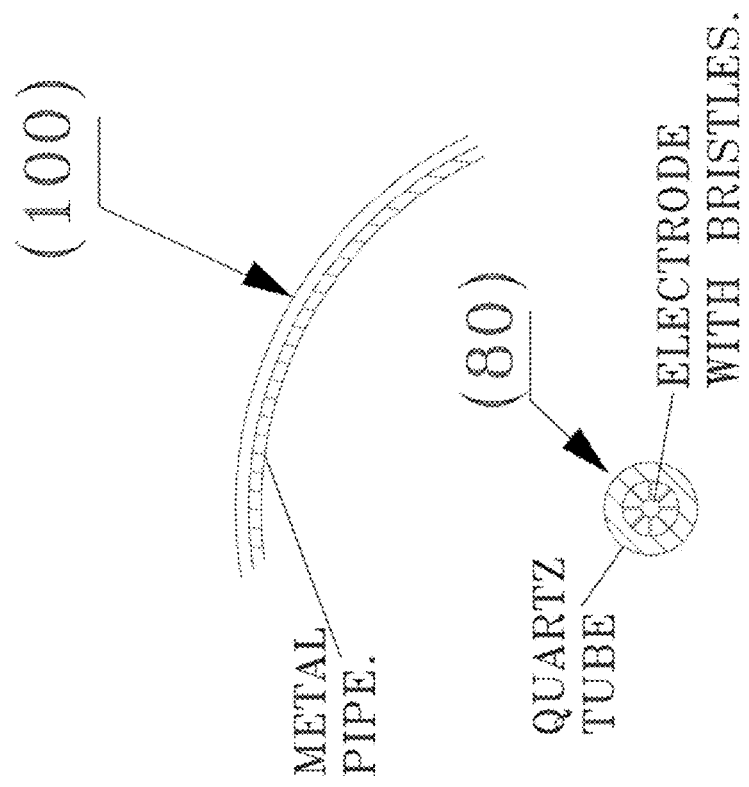
FIGURE: 7

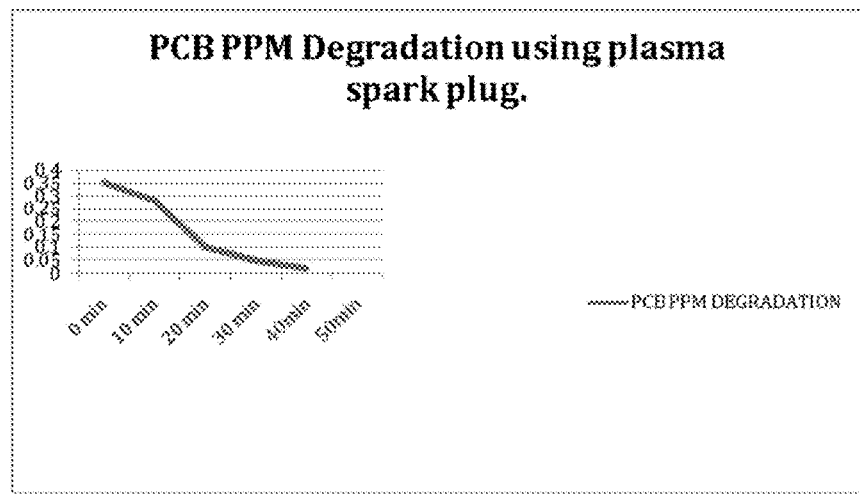
FIGURE: 8

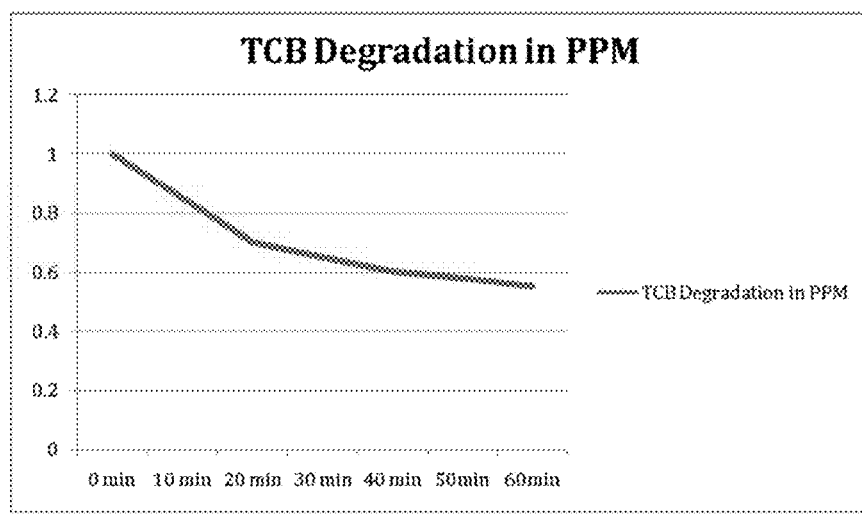
FIGURE: 9

ELECTRIC ARC FOR AQUEOUS FLUID TREATMENT

This application is a continuation-in-part of U.S. application Ser. No. 13/252,198, now U.S. Pat. No. 9,028,689, filed Oct. 4, 2011, which is incorporated by reference in its entirety.

FIELD OF THE INVENTION

The present invention generally relates to the field of fluid treatment and particularly to fluid treatments using electro-chemical methods and systems.

BACKGROUND OF THE INVENTION

Electro-hydraulic oxidation has been used to precipitate metals and oxidize organic compounds with supercritical water conditions. Electro-chemical oxidation has been used to remove chemical oxygen demand (COD) in high organic load conditions such as sewage treatment on cruise ships and manufacturing foodstuffs such as cheese. Though electro-chlorination and mediated electro-chemical oxidation have been found to be efficient at mineralizing normal organic compound, they cannot oxidize recalcitrant man-made organic compounds. Electro-chemical oxidation with gas ozone addition has been used to remove recalcitrant organic compound (pollutants) in the presence of normal organic compounds in the effluent.
Electro-coagulation and precipitation has been used to remove chemical oxygen demand and hardness salts from effluent. Electro-sterilization has been used in the food industry as an alternative to thermal pasteurization.

Current technology uses an iron or aluminum anode to precipitate the organic matter from the aqueous solution. To reduce the bacteria population, a biocide is then added to the treated water. If reduced scaling tendencies is desired an anti-scalent is added to the treated water. If the organic compound is dissolved in the water like medical drugs, then the flocculent does not work on those compounds and if there is not sufficient organic compound to flocculate it still will not work. Ozone is sometimes added to the process to help with oxidation of organics, but its reaction rate is slow. In the food industry, the taste of iron or aluminum in the recycled water is undesired.

The present invention is directed to overcoming these shortcomings in the prior art.

SUMMARY OF THE INVENTION

The present invention generally provides a novel system, which can employ a three (3) step process for treating fluid. In the first step electro-chlorination and precipitation can be used to remove normal organic compounds and hardness. The second step then treats the remaining organic compounds with electro-hydraulic discharge preferably by using oxygen and/or Ozone gas injection to maximize mixed oxidant generation. Finally, the third step polishes the remaining recalcitrant organic compounds with a dielectric discharge in oxygen gas foam. With use of the present invention, industrial mixed waste or city sewage from industrial areas can be treated for environmental release with recalcitrant compounds mineralized to carbon dioxide.

The present invention removes all or virtually all organic compounds in water by oxidizing them to carbon dioxide and water vapor. The very low concentrations of medical drugs are removed from the water by direct oxidation with an oxygen plasma in a bubble. With the present invention system and method there is no after taste in the water after treatment. Therefore, the water treated by the present invention system and method can be recycled for the food industry without any danger of contamination.

Thus, the present invention provides an improved method and system for treating fluids.

BRIEF DESCRIPTION OF THE DRAWINGS

FIG. 7 is a sectional view of the quartz tube and partial sectional view of the preferred metal reactor pipe in accordance with the present invention system and method;

FIG. 8 is a graph showing PCB PPM Degradation in one non-limiting example; and

FIG. 9 is a graph showing TCB Degradation in PPM in one non-limiting example.

DETAILED DESCRIPTION OF THE INVENTION

Figure 4:
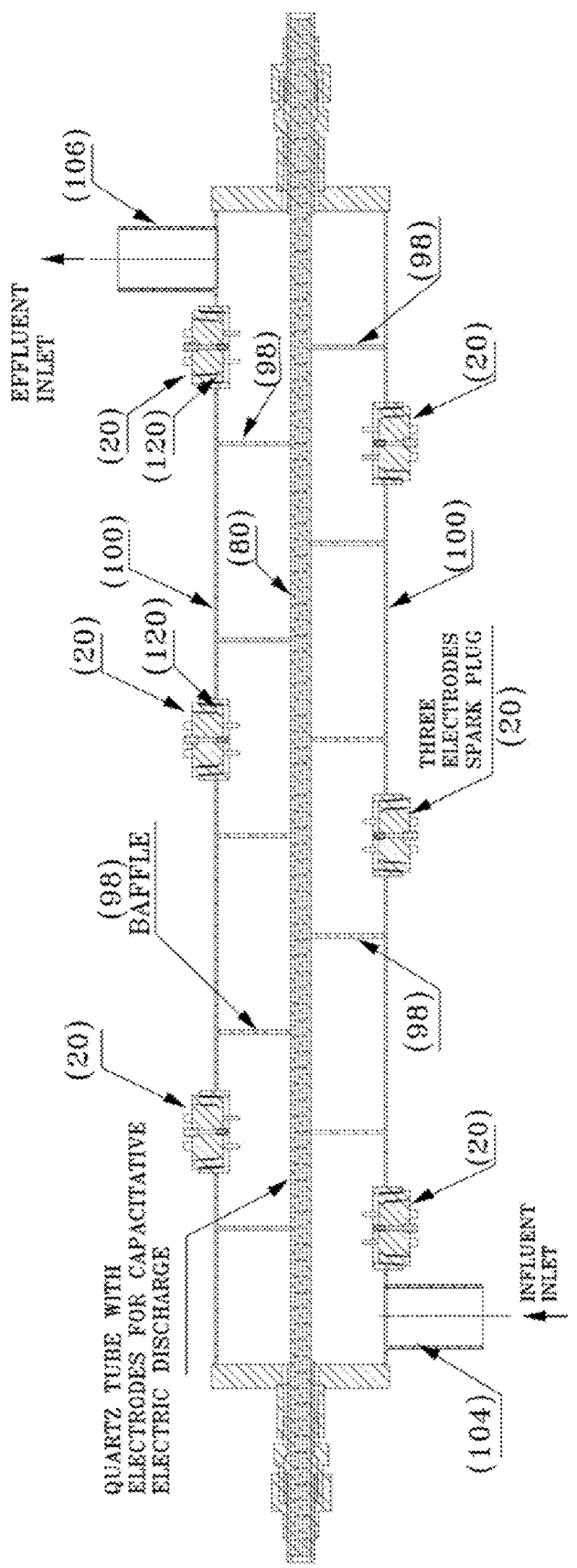
FIG. 4 is side sectional view of a reactor pipe having a plurality of the three electrode spark plugs of FIG. 1, a plurality of baffles and a discharge tube in accordance with the present invention system and method.

As seen in the drawings the present invention system and method for treating fluids is shown and generally designated as system 10 (FIG. 4). In a preferred embodiment one method for removing recalcitrant organic compounds is the combination of electro-hydraulic discharge for mixed oxidant and oxygen foam generation followed by a glow discharge in oxygen foam to directly oxidize remaining organic compounds at the liquid/gas interface in each bubble in the foam.

Figure 1:
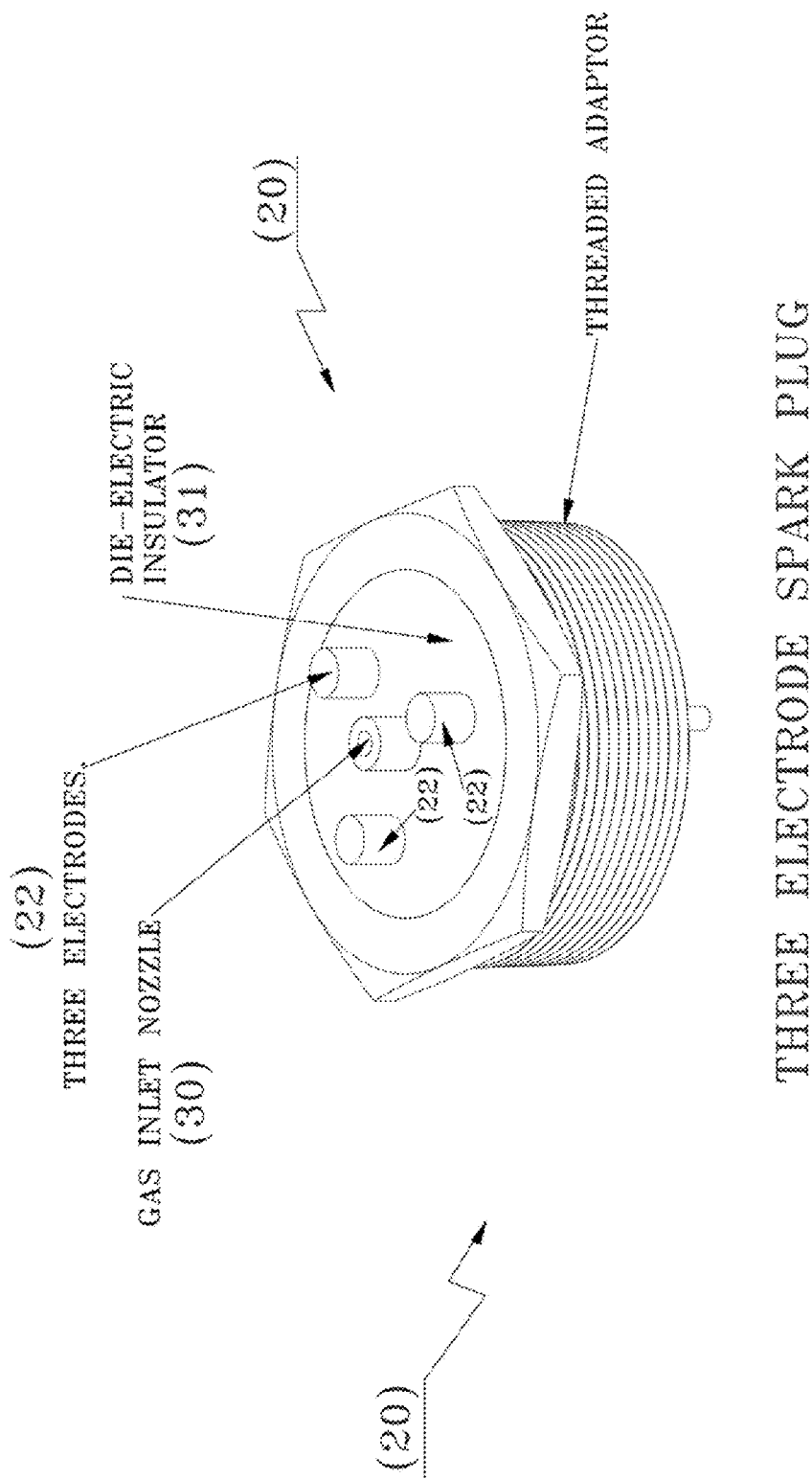
FIG. 1 is a perspective view of a preferred three electrode spark plug used in accordance with the present invention system and method.
Figure 2:
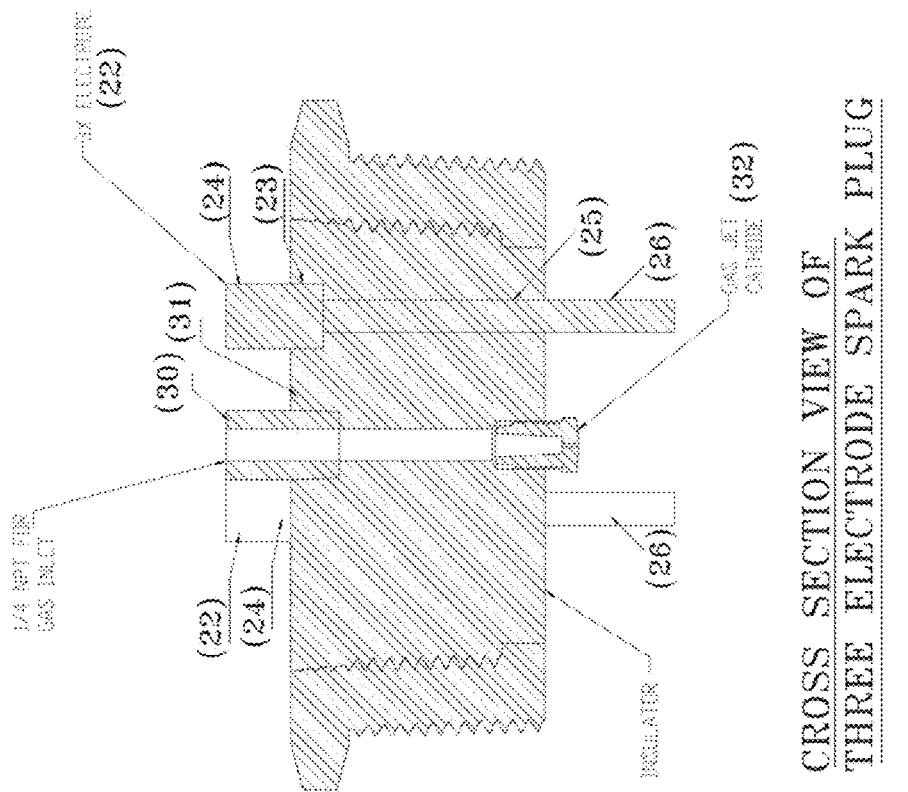
FIG. 2 is a side sectional view of the three electrode spark plug of FIG. 1.

FIGS. 1 and 2 illustrates a preferred three electrode spark plug generally designated as reference numeral 20 that can be used with system 10 and preferably in communication with the internal fluid contents contained within a reactor pipe 100 (FIG. 4). With this preferred three-phase electrode assembly, the ground electrode can be the gas inlet nozzle 30. A preferred die-electric insulator surface 31 helps to prevent or reduce shorting out the electric pulse between electrodes 22. Electrodes 22 can be preferably replaceable and can be preferably electrically connected to power supply 60 preferably from the bottom of the electrodes 22 (See FIG. 3). A gas nozzle 40 can be provided for injecting atomized gas into the fluid contained within reactor pipe 100 (FIG. 4) or other container. Though not considered limiting, gas nozzle 40 can be preferably disposed in the center or substantially center of the electrodes 22 making up the electrode assembly. The electrical current return on the electrode assembly can be through the gas nozzle opening.

The electrical discharge through the gas jet 32 and in the fluid phase creates atomic oxygen from the oxygen gas and hydroxyl radicals from the aqueous fluid phase. Most free radicals will recombine to make hydrogen peroxide and ozone gas while others will find organic compounds to oxidize in the fluid. The injected gas through the gas jet cathode 32 can be air or oxygen gas, but higher ozone concentrations are created with oxygen gas. The gas supply pressure can be pulsed to help promote small bubble foam generation for the next process.

Figure 3:
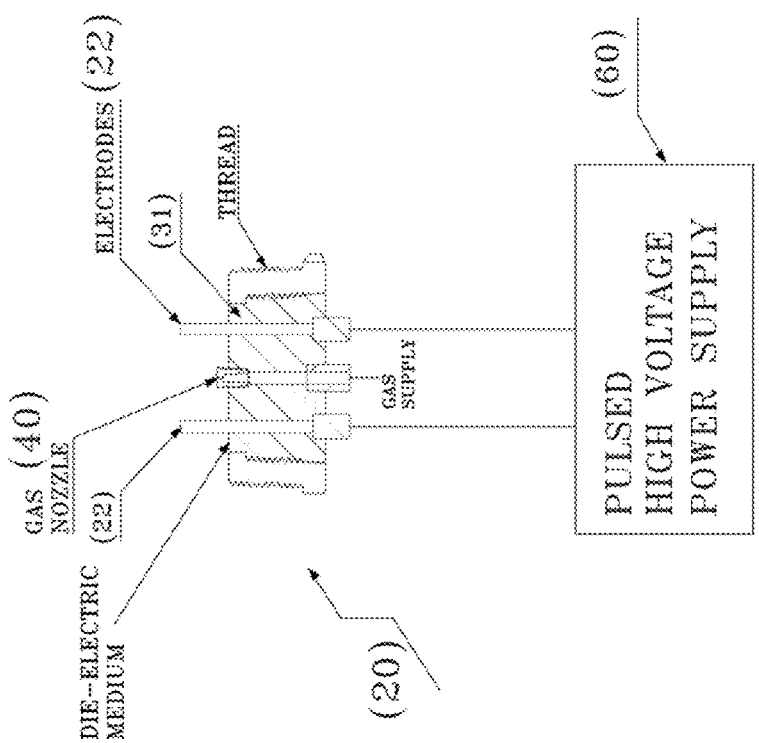
FIG. 3 is a side sectional view of the three electrode spark plug of FIG. 1 showing attached to a pulsed high voltage power supply.

As shown in FIG. 3, electrodes 22 can be electronically connected to high voltage power supply 60 where a high voltage pulse, such as, but not limited to about 1 KV to about 100 KV (including any value there between) can be generated and supplied to the three phase electrodes 22.

Each electrode 22 can be provided with a head portion 24 and a post portion 26 (FIG. 2). Each electrode 22 can be connected to the die-electric insulator 31 by convention means, including but not limited to a threaded relationships (i.e. threads on head portion 24 mating with internal threads of openings 21 through insulator 31 for insertion therethrough of corresponding electrodes (See FIG. 2). A snug fit between head portion 24 and the corresponding insulator opening 21 (i.e. portion 23) can also be provided in lieu of a threaded connection relationship. As also seen in FIG. 2, each insulator opening 21 can have a larger diameter opening portion 23 in communication with a smaller diameter opening portion 25. When properly connected or secured, electrodes 22 can be preferably removably installed in the body of the spark plug assembly 20, which is preferably accomplished by means of threads in the die electric material/insulator 31. Electrodes 22 can be preferably coated with metal, which can withstand high temperatures as well as oxidation environment. It is also preferred to have a ceramic coating on electrodes 22 to prevent them from etching. Nozzle 40 can be made of ceramic material to prevent erosion from the electric discharge through the gas phase.

The whole body of the spark plug apparatus 20 can be watertight and can withstand hydraulic pressure of pipe 100 or container, which contains the fluid. The pulse mode of the plasma spark generates acoustic waves in the fluid contained within pipe 100, which are then utilized to create acoustic cavitation in the flowing fluid medium. The cavitation in the fluid helps break up organic compounds in the fluid and promotes small bubble generation in the foam.

Spark plug apparatus 20 can be provided with external adaptor 37 having threads 39 which mate with threaded openings 102 in reactor pipe 100, when securing spark plug apparatus 20 to reactor pipe 100 in a water tight configuration. Reactor pipe 100 can be provided within a fluid or influent inlet 104 and a fluid outlet 106 (which can be also referred to as an effluent inlet).

System 10 can also include a die electric tube 80 which can be considered located downstream of the three phase electrode assemblies 20. Die-electric tube 80 can positioned such that it is within and concentric or substantially concentric to pipe 100 (See FIGS. 4 and 8). In uses, a high voltage pulse can be discharged along the tube surface and into the fluid foamed with oxygen gas from assemblies 20. The ground current return can be the body of pipe 100 itself. As the electric discharge travels through the foam, each bubble interface becomes ionized and makes plasma out of the oxygen gas on the near side of the bubble. The generated atomic oxygen will react with avail organic compounds or they will form hydrogen peroxide and ozone gas. With such high surface area generated by the foam, organic compounds can be removed to the parts per billion concentrations.

The capacitive discharge tube 80 preferably contains a quartz tube in the center or substantially center of reactor pipe 100. The quartz tube contains a conductive gas or metal electrode with multiple bristles (See FIG. 8). Without limitation, the conductive gas could be Argon, Mercury vapor, hydrogen, etc., which helps to conduct the high voltage electricity through the quartz die electric medium to metal pipe 100. High voltage can be applied though this medium causing a corona discharge established between the quartz tube and the body of the pipe.

Each individual spark releases energy in the form of UV light, heat, and mechanical vibration. The sparks breakdown the oxygen nano bubbles producing O3 molecules, OH— radicals. These oxidants in turn produced more multi oxidants, which can then be utilized to oxidize the contaminants in the influent.

The corona discharge element (electric conductive gas or electrode with filaments) can provide a capacitive load where Ozone and/or hydroxyl radicals are produced from oxygen produced as a direct result of an electric discharge in the oxygen foam. To control and maintain the electrical discharge a die-electric quartz tube can be used. The power supply to the central corona discharge tube can sweep the frequency and voltage to find an optimum power required far the process.

Figure 5:
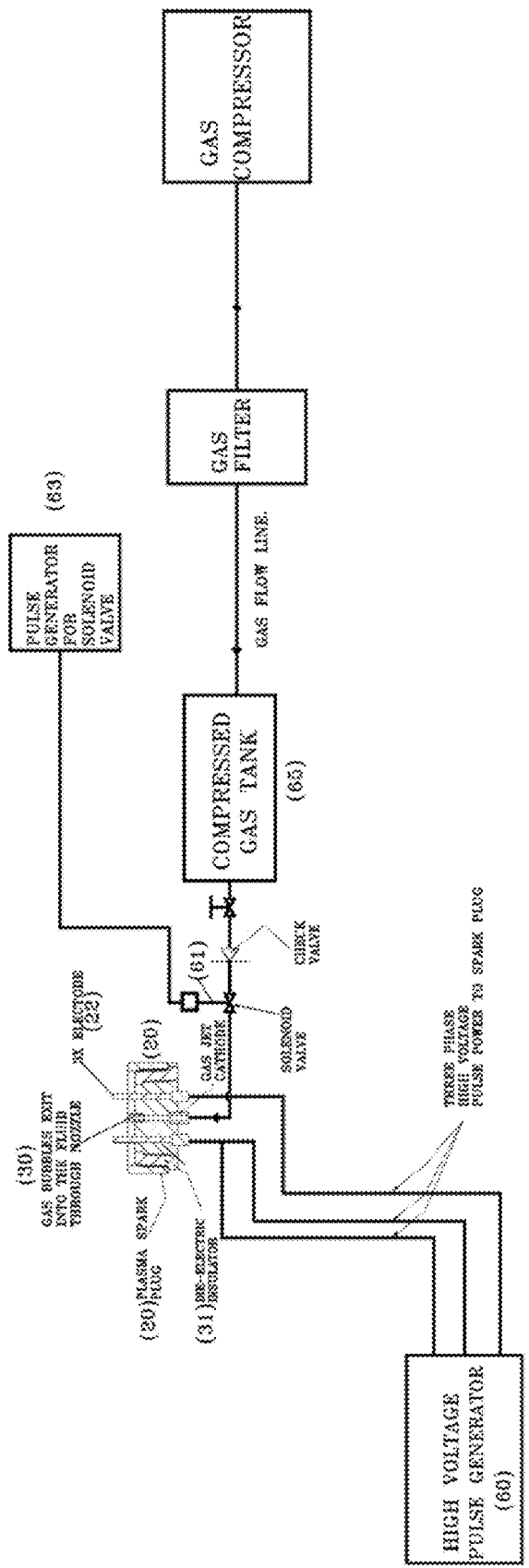
FIG. 5 is a preferred plumbing and wiring diagram for the preferred three-phase electrode assembly of the present invention system and method.

FIG. 5 below shows a primary component plumbing and wiring diagram for the three-phase electrode assembly 20. For multiple assemblies 20 installed an a pipe 100 (See FIG. 4), they are all can be wired in parallel for the electrical and gas supply.

Figure 6:
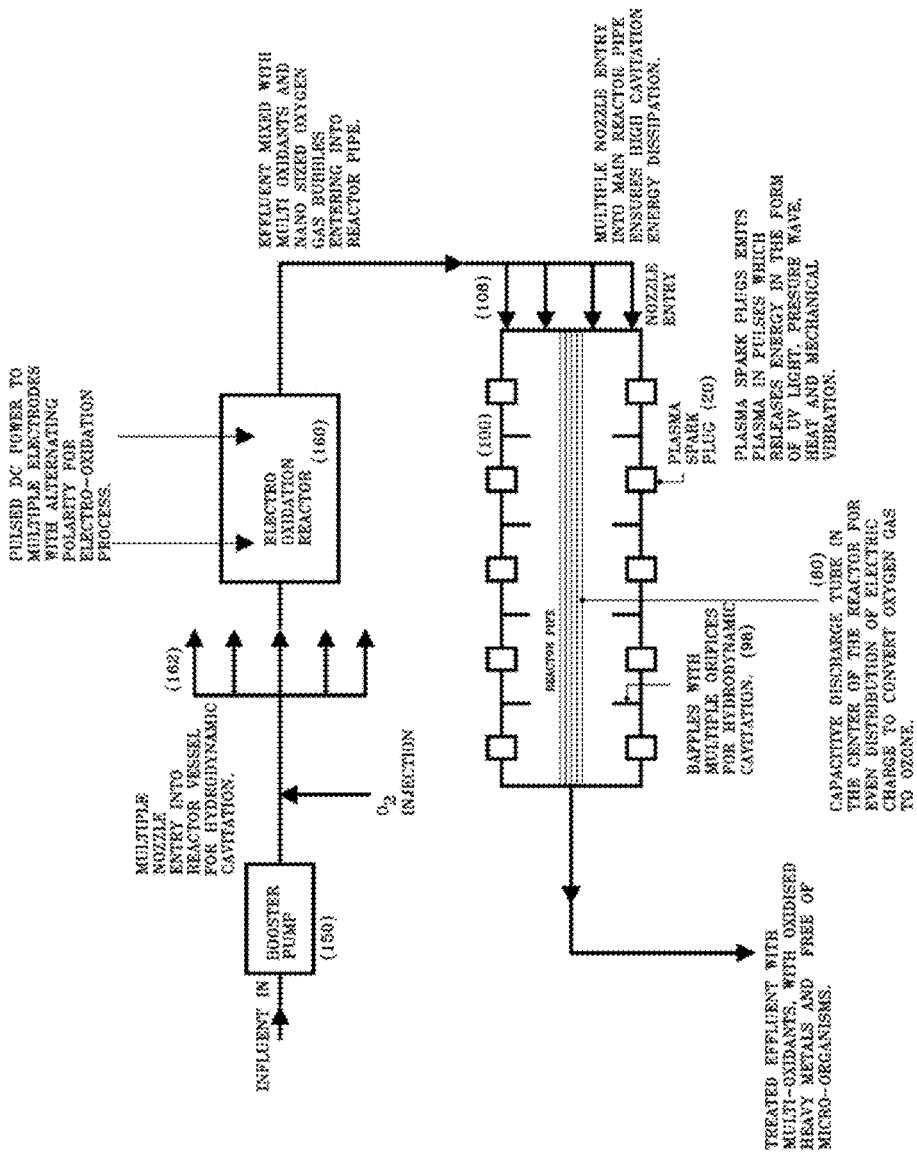
FIG. 6 is a flow diagram for the present invention system and method.

FIG. 6 illustrates a flow diagram for the three-phase fluid treatment method and system of the present invention, which uses an Electrolytic cell and reactor pipe with spark plugs. The influent (i.e. fluid or water to be treated) enters into the process through a booster pump 150 and is mixed with oxidant gas, e.g. ozone, oxygen, etc. preferably using a Venturi setup. A higher-pressure difference across the Venturi creates a vacuum allowing the oxidant gas to mix well with the influent stream. The pressurized influent mixed with the oxidants is then preferably discharged within an electro oxidation or electrolytic cell reactor 160, through one or more, and preferably through a series of nozzles. Reactor 160 can be a tank, vessel, container or similar structure, which acts as a reactor vessel for hydrodynamic cavitation.

Electrolytic cell reactor 160 can be provided with electrodes that are connected to a DC power supply, which can provide pulsed DC power into the water (i.e. influent) through the electrodes. Thus, reactor vessel 160 can be an electro oxidation reactor where pulsed DC power is provided or supplied to one or more, and preferably multiple electrodes with alternating polarity to provide an electro-oxidation process on the fluid within reactor vessel 160. Accordingly, within vessel 160 water is electrolytically treated through components, preferably including, but not limited to influent inlet arrangements for cavitation and one or more pairs of electrodes. The electrodes can be suitable for a continuous anodic and cathodic operation for treating water within reactor vessel 160.

The pressurized influent premixed with oxidant gas such as, but not limited to, ozone, oxygen can be pumped into reactor vessel 160 through mixing nozzles 162 which can be arranged radially along the circumference. A power source for each reactor 160 provides voltage and current to the electrodes. A controller maintains the voltage and current to the electrode. The duration of each voltage polarity applied to each electrode can preferably be the same. The polarity of the voltage to the electrode can be periodically reversed at a set interval.

Though the flow diagram shows one reactor vessel 160, it should be recognized that one or more reactor vessels 160 can be provided with each vessel 160 having one or more pairs of electrodes that can be preferably coated with mixed oxides, Nobel metals and/or boron doped diamond electrodes. The power source for each reactor 160 provides voltage and current to the electrodes. A controller is provided for switching and regulating the voltage and current to the electrodes. Preferably, the polarity of the electrodes can be reversed at controlled intervals. Electrolysis of the fluid takes place at the cathode and anode, wherein at the cathode the hydrogen gas can be liberated generating hydroxide group and raising the pH of the water locally. The formation of OH— radical at the cathode reacts with the organic and inorganic compounds to accelerate the oxidation reaction.

The polarity of the electrodes associated with reactor 160 can be periodically reversed to mitigate electrode surface scaling. The oxidant gas is injected through a Venturi and mixed with the incoming influent prior to entry into reactor 160. The influent mixed with the oxidant gas bubbles preferably discharges into reactor 160 through one or multiple nozzles 162 preferably arranged in a circular array. The array of nozzles 162 direct the influent flow preferably into the center of reactor 160 where high turbulence energy dissipation is achieved. The oxidant gas bubbles are subjected to pressure and velocity variation causing them to collapse which causes the phenomenon called sonoluminescence.

The introduction of an oxidizing agent through the discharge nozzles 162 into reactor 160 forms cavitation nano bubbles by hydrodynamic cavitation in a low-pressure zone. These nano gas bubbles collapse/implode as they pass through an increase pressure zone. Collapse of the cavitation bubbles may produce ultraviolet oxidation of organic substance in the fluid. The collapsing of the cavitation bubbles produces high-energy condition like ultraviolet light, shearing, high pressure, heat, mechanical vibration, noise, etc.

The electro chemical oxidation within reactor 160 using inert electrodes can take place through two mechanisms: 1) direct oxidation where pollutants are destroyed at the anode surface: 2) indirect oxidation where a mediator is electrochemically generated to carry out the oxidation. A mass transfer from the bulk solution to the electrode surface takes place, and then homogenous or heterogeneous chemical reactions occur at the electrode surface. In addition, the electron transfer occurs at the electrode surface The rate of the electron transfer is governed by the electrode activity and the current density where as the extent of the mass transfer will be controlled by the turbulence in the reactor vessel.

Reactor vessel 160 can be provided with an ammonia gas outlet or vent for reduction of NOX caused by the release of ammonia gas from the electro-oxidation process. The above-described electro-oxidation process constitutes the first phase of the fluid treatment process in accordance with the present invention.

The fluid treated by the above discussed first phase (i.e. effluent mixed with multi oxidants and nano sized oxygen gas bubbles) is then forwarded and permitted to enter within reactor pipe 100 preferably through one or more or multiple nozzle entries 108 which ensure or help to ensure relatively high cavitation energy dissipation.

Reactor pipe 100 is provided with at least one and preferably a plurality of spark plugs 20 disposed along reactor pipe 100 and with each spark plug 20 having their electrodes 22 and gas nozzle 40 positioned within pipe 100 and in physical contact with the fluid. With the fluid contained within reactor pipe 100, each spark plug 20 emits electric sparks, preferably in pulses, which releases energy in the form of ultraviolet (UV) light, pressure wave, heat and mechanical vibration. A preferably centrally located capacitive discharge tube 80 can also be disposed within reactor pipe 100. Tube 80 provides an electric charge, which converts oxygen gas to ozone. By being preferably centrally located and even distribution of the electric charge can be achieved.

One or more, and preferably a plurality of, baffles 98 can be positioned within reactor pipe 100. Baffles 98 can be provided with multiple orifices therein for hydrodynamic cavitation purposes. Baffles 98 help to harness the potential energy of the pressure head and velocity into the hydrodynamic cavitation and also help with the efficient mixing of the oxidant gas nano bubbles with the effluent. The pressure velocity relation of the flowing fluid can be used to create the hydrodynamic cavitation. At each orifice hole, the kinetic energy of the liquid increases at the expense of the pressure head, causing the pressure around the orifices to drop below the threshold pressure for hydrodynamic cavitation. Subsequently as the liquid jet expands, the pressure increases resulting in the collapse of the gas bubbles. During the passage of the effluent through the multiple baffle orifices, boundary layer separation can occur and relatively high turbulent energy dissipation observed downstream.

The preferred three prong spark plugs 20 installed on reactor pipe 100 are meant to release a spark in the effluent using pulse voltage generator 60. Pulse voltage generator 60 with a high voltage discharge is considered to overcome the dielectric resistance of the effluent. Pulse voltage generator 60 establishes the sparks in the effluent within reactor pipe 100. Gas solenoid valve 61 can be provided for synchronizing the pulsation and discharging the oxidant gas in the effluent (See FIG. 5). A gas bubble trapped in the middle of the spark implodes and the oxidant gas nano bubbles can be converted into multiple oxidants, such as, but not limited to O3, OH—, HO2, H2O2, O, etc. These super oxidants can then be used to oxidize contaminants present in the effluent.

Plasma spark plugs 20 emit plasma in pulses, which release energy in the form of UV light, pressure wave, heat and mechanical vibration. The UV light emitted in the effluent by spark plug 20 helps in the disinfection process and for sterilizing the effluent. The pulse mode of the spark in the effluent generates the sonic waves in the effluent. The subsequent compression and rarefaction cycle of the sound waves causes the bubbles to expand and collapse releasing relatively large amounts of energy in the form of heat, UV light, mechanical vibration, and shear. This form of energy is utilized for oxidation and sterilization of the effluent. Pulse generator 63 can be provided for matching the frequency of the oxidant gas discharge into the effluent with the spark pulse generator 60. A compressed gas tank 65 can also be provided for storing the gas for the process and to act as an accumulator.

The energy released by spark plugs 20 constitutes the second phase of treatment in accordance with the present invention, while the electric charge provided by tube 80 to convert oxygen gas to ozone constitutes the third phase of the treatment. Upon exiting reactor pipe 100, the effluent is treated with multi-oxidants, with oxidized heavy metals and is free of micro-organisms in accordance with the present invention system and method.

As mentioned above a capacitive discharge tube 80 can be provided in the center of reactor pipe 100 for even distribution of electric charge to convert oxygen gas to ozone. This function of the capacitive discharge tube 80 can be considered the third phase of treatment.

After traveling the through the above described treatment phases, the treated effluent leave reactor pipe 100 and contains multi-oxidants with oxidized heavy metals and free or at least virtually free of micro-organisms.

Certain features, benefits and/or advantages of the present invention, include, but are not limited to the following:

1. A mixed oxidant generator preferably comprising 4 electrodes preferably wired in a 'Y' 3-phase current configuration. The pulse width can be from about 4 to about 20 microseconds for a square wave current, though not considered limiting or from about 200 to about 2000 Hz for sinusoidal current, though not considered limited. The fourth electrode can be submerged in flowing gas with an about 20 to about 100% oxygen concentration. The three electrodes can be submerged in the aqueous solution contained within a reactor pipe 160 and the electrode composition can preferably be made of conductive carbide ceramic, such as porous silicon carbide, though such is not considered limiting. The pulse voltage preferably ranges from about 20 to about 100 kV, though such is not considered limiting. The gas pulse frequency preferably ranges from about 0.1 to about 15 Hz. A connecting adaptor can be provided for connected a source of gas through solenoid valve and connection mechanisms can be provided for connecting the three electrodes to a high voltage source to create a electric discharge across the four electrodes;

2. A plurality of the generators are provided and along with a plurality of static mixers can be disposed in connection with a reaction pipe such that static mixers will distribute the generated mixed oxidants with bulk aqueous fluid and pulse amplitude is high enough to cause dynamic cavitation of aqueous fluid within the pipe and a die-electric surface such as quartz tube is use to create a electrical discharge into the foamy bulk fluid;

3. The flow aqueous fluid in the reaction pipe is at a velocity high enough to cause hydraulic cavitation with the static mixers and inject enough oxygen gas to create 20-90% quality foam;

4. The electrodes of the generator can be threadedly engaged with the insulator portion of the generator and are replaceable; and 5. The central electrode of the generator can comprise a gas nozzle, which can be replaced in case of wear and tear.

Thus, in summary, the first stage of the present invention system and method is the electro-chemical cell that oxidizes hulk reactive organic material such as live cellular material in surface water (algae and plankton), bio-processed sewage water, and wash water from food processing. The major oxidation path ways can be chlorine produced on the anode surface, direct oxidation on the anode surface, and hydroperoxyl radial produced on the cathode surface. This stage is designed to reduce organic contamination at percent concentrations.

The second stage is electro-spark array in the pipe reactor. The electrical discharge in the gas jet and in the water generates ozone in the gas phase and hydroxyl radicals in the liquid phase. The hydroxyl radical will oxidize chloro-carbon compounds that represent lubricants, drugs, and pesticides and ethylene oxide compounds that represent polymers and plastics. The discharge also generates cavitation in the aqueous phase in the pipe and the cavitation promotes mixing of the oxidant with the bulk liquid phase. This stage is design to reduce organic contamination at 100 of ppm concentration.

The final polishing stage is the pulse discharge in the oxygen gas foam. The oxygen plasma generated inside each individual bubble will react with fluoro-carbon compounds that represent refrigerants and lubricants in industry and hormones such as estrogen. The polishing stage can reduce organic contamination below 1 ppm and can oxidize compound concentrations below 10 ppb.

Thus, in one embodiment, a high voltage DC pulse power supply is provided which can supply a 3 phase rotating polarity DC power to active electrodes at high frequency in a pulsed manner.

A source of gas supply for pure oxygen or pure ozone can be provided to supply about 20%-about 100% pure oxygen gas to the gas injection nozzle. Make up gas (about 80%-0%) can be inert gases, such as but not limited to, Argon to maintain the high purity of the oxygen.

In one embodiment, four electrodes can be used. Three active electrodes which can act as one anode and two cathodes and a passive ground electrode. The three active electrodes can be 3-phase electrodes connected to the high voltage three phase DC pulse power supply such as shown in FIG. 5. A gas jet nozzle can also act as a passive ground electrode as it can be bodily connected to ground through the gas flow line path as also shown in FIG. 5. The gas jet nozzle is not an active electrode but a passive electrode as it is preferably not connected to the power supply at all. One role of the passive ground electrode is to capture the residual stray electrons floating around in the vicinity and send it to ground to avoid their build up in space around the active electrodes which might create an electric shock for the operator during handling.

The active electrodes are separate than the passive ground electrode. Also, the electrodes can vary in their polarity due to the power supply that is used. The polarity of our active electrodes, anodes and cathodes preferably change every cycle. Thus if electrode A is anode and electrodes B and C are cathodes in one cycle, Electrode B becomes anode and electrodes A and C become cathode. The current, as well as voltage, vary depending upon when the spark discharge triggers. Preferably, the system uses 3 phase DC power supply and preferably provides for three active electrodes in a special shaped configuration of electrodes. The power supply can be a high voltage DC pulse power supply which provides a three phase, rotating polarity, DC power to the three active electrodes in a pulsed manner. As mentioned before, electrode A becomes anode and electrodes B and C become cathodes at very high DC voltage in one cycle. In the next cycle, B becomes anode and A & C become cathode and this rotating of anode and cathodes continues indefinitely during a pulse of about 2 seconds at frequency of about 6-about 6000 Hz (about 6-about 6000 cycles/second).

The disclosed dielectric medium can preferably be a continuous solid block, which houses all the four electrodes. The dielectric medium preferably provides support to secure the electrodes as well as to provide insulation for the electrodes. The preferred solid chunk of dielectric medium can also be suitable to withstand high pressures that may exist in the reactor pipe.

The anodes and cathodes can preferably be solids rods of sufficient thickness to withstand the spark discharge as well as the pressure in the reactor pipe. A dedicated, specially designed injector port for gas injection can be provided and can be a venturi nozzle for gas injection. The design of the injector port allows for the generation of extremely fine and uniform bubbles in the liquid. This extremely fine and uniform bubble generation helps in creating a foam around the active electrodes that lasts longer than normal bubbles due to lower rise velocity and helps in achieving a better spark discharge.

References to nozzle in the disclosure, are referring to the disclosed venture nozzle. The disclosed gas injection is set up using the venture nozzle, which can create a very fine and uniform bubble size of gas thus producing a longer lasting finer foam around the electrodes which helps in a better spark discharge among the active electrodes. Bigger gas bubbles do not last long around the cathode and anode and rise to the water surface very fast thus giving a very short time for discharge around the active electrodes of anode and cathode. The disclosed gas injection portion can be provided with a venturi shape to create the fine, uniform gas bubbles to generate uniform form in the liquid as opposed to bigger, non-uniform gas bubbles.

The disclosed electrodes are preferably made from a completely pure single material of conductive ceramic carbide. Thus, the whole solid rod active electrodes can be completely made of only conductive ceramic carbide material. Since there is only one pure material of construction, issues with micro-cracks development in the electrodes are significantly reduced, if not eliminated.

Preferably, the system used less than about 90% oxygen and greater than about 10% air or pure oxygen or pure ozone or pure argon or a mixture of oxygen and inert argon as make up gas to maintain the purity of oxygen gas. By using 100% oxygen or as little amount of air (<10%) as possible, in addition to pure oxygen, the efficiency of production of oxidizing species such as O, OH, O3, H2O2 etc. is increased, and the presence of nitrogen (found in air) is significantly reduced, if not limited. The presence of nitrogen impurities in the source gas produces pollutant species such as NOx gases during spark discharge and also consumes the available oxygen and the produced oxidizing species thus reducing the availability of produced oxidizing species in the liquid. Thus, pure oxygen gas is preferably used or a mixture of pure oxygen and inert argon as make up gas to maintain the purity of the oxygen and avoid the presence of nitrogen impurities.

The disclosed Y electrode arrangement, in communication with a DC high voltage pulse power supply, produces a spark discharge under water. Thus, all active electrodes can be completely submerged in the liquid. Even if there is no injection of gas, a spark discharge can still be produced using the rotating polarity electrode because of the very high voltage barrier that can be created for extremely short periods of time, just sufficient to produce spark discharges under water.

The term "pulse" can be defined to mean that the gas flows for a short period of time, such as, but not limited to, about 2 seconds, then stops for a short period of time, such as, but not limited to, about 4 seconds, then flows again for a short period of time and this process continues indefinitely. This process can be controlled by a solenoid control valve, such as, but not limited to, solenoid control valve 61 shown in FIG. 5. The ON/OFF time of the gas flow through the solenoid control valve can be regulated by a pulse generator 63 for the solenoid valve.

All locations, sizes, shapes, measurements, amounts, angles, voltages, frequencies, component or part locations, configurations, temperatures, weights, dimensions, values, percentages, materials, orientations, etc. discussed above or shown in the drawings are merely by way of example and are not considered limiting and other locations, sizes, shapes, measurements, amounts, angles, voltages, frequencies, component or part locations, configurations, temperatures, weights, dimensions, values, percentages, materials, orientations etc. can be chosen and used and all are considered within the scope of the invention.

Unless feature(s), part(s), component(s), characteristic(s) or function(s) described in the specification or shown in the drawings for a claim element, claim step or claim term specifically appear in the claim with the claim element, claim step or claim term, then the inventor does not considered such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A method for treating fluid comprising the steps of:
   (a) providing a source of fluid;
   (b) directing the source of fluid into an electro-chemical cell
   (c) oxidizing bulk reactive organic material contained in the source of fluid in the electro-chemical cell;
   (d) directing the source of fluid out of the electro-chemical cell and into a reactor pipe;
   (e) providing a source of gas and creating an electro-spark array in the reactor pipe to generate ozone in a gas phase and hydroxyl radicals in a liquid phase, wherein the hydroxyl radicals oxidize chloro-carbon compounds from the source of fluid and ethylene oxide compounds from the source of fluid and wherein cavitation is generated in the liquid phase within the reactor pipe and to promote mixing of the oxidant;
   (f) creating a pulse discharge in oxygen gas foam; wherein oxygen plasma generated inside each individual bubble of the foam will react with fluoro-carbon compounds from the source of fluid.

* * * * *